(12) United States Patent
Hidaka et al.

(10) Patent No.: US 10,030,759 B2
(45) Date of Patent: Jul. 24, 2018

(54) BREATHER DEVICE

(71) Applicant: HONDA MOTOR CO., LTD., Tokyo (JP)

(72) Inventors: Yuichi Hidaka, Wako (JP); Yoshiaki Shutou, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/440,177

(22) Filed: Feb. 23, 2017

(65) Prior Publication Data
US 2017/0248221 A1 Aug. 31, 2017

(30) Foreign Application Priority Data
Feb. 25, 2016 (JP) .................................. 2016-034707

(51) Int. Cl.
*F16H 57/02* (2012.01)
*F16H 57/027* (2012.01)

(52) U.S. Cl.
CPC .................................. *F16H 57/027* (2013.01)

(58) Field of Classification Search
CPC . F16H 57/027; F16H 57/031; B01D 46/0002; B01D 46/0004
See application file for complete search history.

(56) References Cited

U.S. PATENT DOCUMENTS

| | | | | |
|---|---|---|---|---|
| 1,365,836 | A | * | 1/1921 | Leverett .................... F16M 1/04 184/11.1 |
| 7,191,870 | B2 | * | 3/2007 | Kimura .................. F01M 13/00 184/6.23 |
| 9,809,186 | B2 | * | 11/2017 | Hoshinoya .............. B60R 17/02 |
| 2007/0000729 | A1 | | 1/2007 | Lund et al. |
| 2016/0297385 | A1 | | 10/2016 | Hoshinoya et al. |
| 2017/0276230 | A1 | * | 9/2017 | Frerichs ................ F16H 57/027 |

FOREIGN PATENT DOCUMENTS

| | | | | |
|---|---|---|---|---|
| CA | 2931868 A1 | * | 6/2015 | .............. B60K 1/02 |
| JP | S63-87380 U | | 6/1988 | |
| JP | 2001-355713 A | | 12/2001 | |
| JP | 2013108514 A | * | 6/2013 | |
| JP | 5378487 B2 | | 12/2013 | |
| WO | 2015/083700 A1 | | 6/2015 | |

OTHER PUBLICATIONS

Japanese Office Action dated Jul. 14, 2017, issued in corresponding Japanese Patent Application No. 2016-034707 and partial translation. (8 pages).

* cited by examiner

*Primary Examiner* — Adam D Rogers
(74) *Attorney, Agent, or Firm* — Fitzpatrick, Cella, Harper & Scinto

(57) ABSTRACT

A breather device that is attached to a case of a transmission and performs ventilation in the case, includes: a main body member including a storage portion with a closed bottom and an open upper end; and a cover member configured to close the upper end of the main body member and including a vent hole for ventilation to outside. The storage portion comprises a first chamber having, in a bottom portion, a communicating port communicating with an interior of the case, and a second chamber configured to receive a liquid entering from the vent hole.

10 Claims, 7 Drawing Sheets

BREATHER DEVICE

CROSS-REFERENCE TO RELATED APPLICATION

This application is based upon and claims the benefit of priority from the prior Japanese Patent Application No. 2016-034707, filed on Feb. 25, 2016, the entire contents of which are incorporated herein by reference.

BACKGROUND OF THE INVENTION

Field of the Invention

The present invention relates to a breather device.

Description of the Related Art

A case for the transmission or the like of a vehicle is provided with a breather device that performs ventilation in the case. As such a breather device, there is a separate-type breather device in which a small box (breather box) with a small hole (breath port) for intake is placed as a separate member outside a case, and the interior of the case communicates with the interior of the box and thus communicates with the atmosphere via the small hole for intake.

If the temperature in the case rises along with the traveling of the vehicle, the pressure of air in the case is raised by cubical expansion. In this case, the air whose pressure has risen in the case flows into the box. The air that has flowed into the box is exhausted from the breath port to the atmosphere. On the other hand, if the pressure in the case lowers, external air is sucked from the breath port into the box.

Depending on the traveling state of the vehicle, water may enter the box via the breath port. Then, a gas containing mist-shaped water may exist in the box. Japanese Patent No. 5378487 proposes a technique of separating water from air in the box and suppressing water invasion into the case.

Although the technique described in Japanese Patent No. 5378487 can suppress water invasion into the case, air that has flowed from the case into the box is exhausted to the atmosphere. The air that has flowed from the case into the box may contain mist-shaped oil in the case. The mist-shaped oil is preferably returned to the case again. Even if not the mist-shaped oil but liquid oil flows from the case to the box, the oil in the box is preferably returned to the case again without being mixed with water.

Hence, the present invention enables returning of oil in a case, which has flowed into a breather device, to the case again.

SUMMARY OF THE INVENTION

According to the present invention, there is provided a breather device that is attached to a case of a transmission and performs ventilation in the case, comprising a main body member including a storage portion with a closed bottom and an open upper end, and a cover member configured to close the upper end of the main body member and including a vent hole for ventilation to outside, wherein the storage portion comprises a first chamber having, in a bottom portion, a communicating port communicating with an interior of the case, and a second chamber configured to receive a liquid entering from the vent hole, the communicating port allows oil to move between the case and the first chamber, and the main body member comprises a preventing portion configured to prevent the liquid from circulating between the first chamber and the second chamber.

As described above, according to the present invention, it is possible to provide a technique of returning oil in a case, which has flowed into a breather device, to the case again.

Further features of the present invention will become apparent from the following description of exemplary embodiments (with reference to the attached drawings).

DESCRIPTION OF THE EMBODIMENTS

Figure 1:
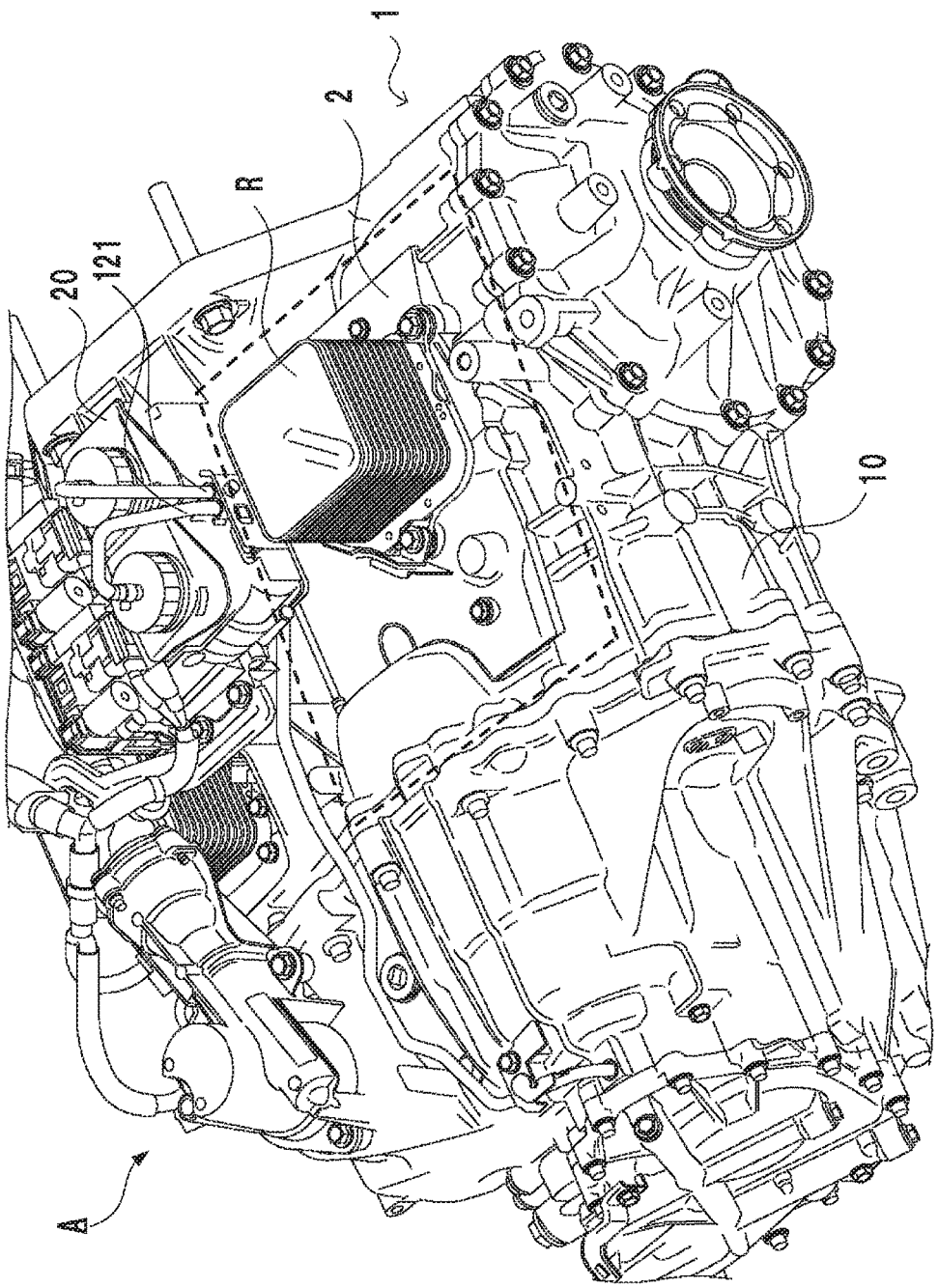
FIG. 1 is a perspective view of a transmission with a breather device according to the embodiment of the present invention.

FIG. 1 is a perspective view of a transmission A with a breather device according to the embodiment of the present invention. In this embodiment, the transmission A can be exemplified as, for example, a dual clutch transmission. However, the present invention is not limited to this. The vertical and horizontal directions of the drawings will be used for a description as the vertical and horizontal directions of the transmission A.

<Breather Device 1>

A breather device 1 is attached to a case 10 in a portion of the transmission A surrounded by a chain line in FIG. 1, and performs ventilation in the case 10. In FIG. 1, a heat exchanger R is arranged on the upper surface of a cover member 2 (to be described later) arranged above the breather device 1. The heat exchanger R is not attached to the breather device 1 but fixed to the case 10 of the transmission A. In the transmission A, a hydraulic oil chamber 20 for a hydrostatic clutch actuator (HCA) or the like is arranged next to the breather device 1. A connecting pipe 121 connected to the breather device 1 extends from the hydraulic oil chamber 20.

Figure 2:
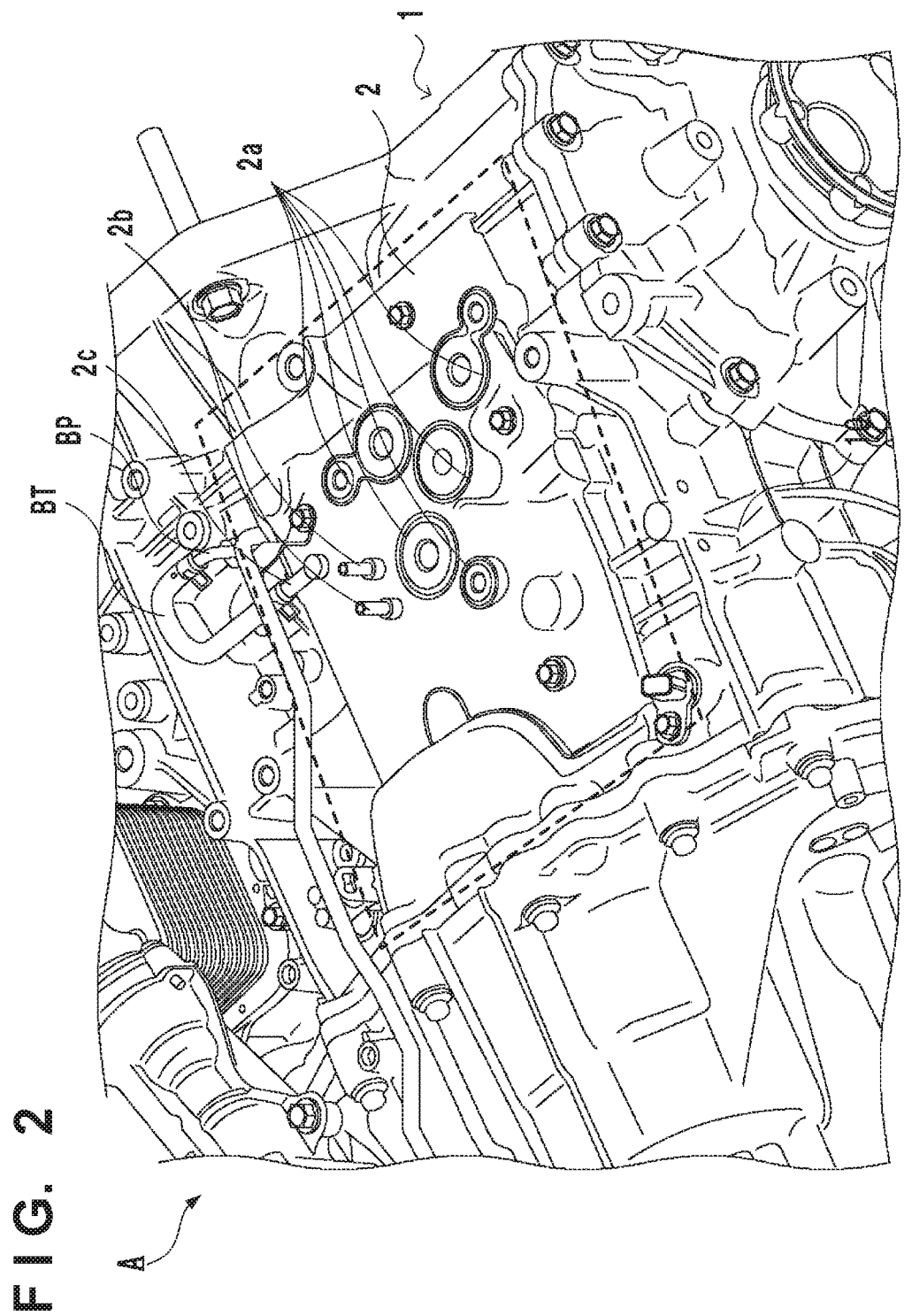
FIG. 2 is a perspective view of the breather device in the transmission shown in FIG. 1.

FIG. 2 is a perspective view showing a state in which in the breather device 1 placed in the transmission A, the heat exchanger R arranged above the breather device 1 and the hydraulic oil chamber 20 arranged next to the breather device 1 are removed. FIG. 2 shows the exposed upper surface of the cover member 2 of the breather device 1. The cover member 2 is provided with a plurality of openings 2a, connecting portions 2b connected to the connecting pipe 121 extending from the hydraulic oil chamber 20, and a ventilation portion 2c with a vent hole 2c1 (to be described later). The plurality of openings 2a store, for example, case-side projections that form passages for connecting the heat exchanger R to the interior of the case. The ventilation portion 2c is connected to one end of a breather tube BT. The other end of the breather tube BT is connected to a breather pipe BP formed in the case 10 of the transmission A. The breather pipe BP is connected to, for example, a damper chamber in the transmission A and communicates with atmosphere.

Figure 3A:
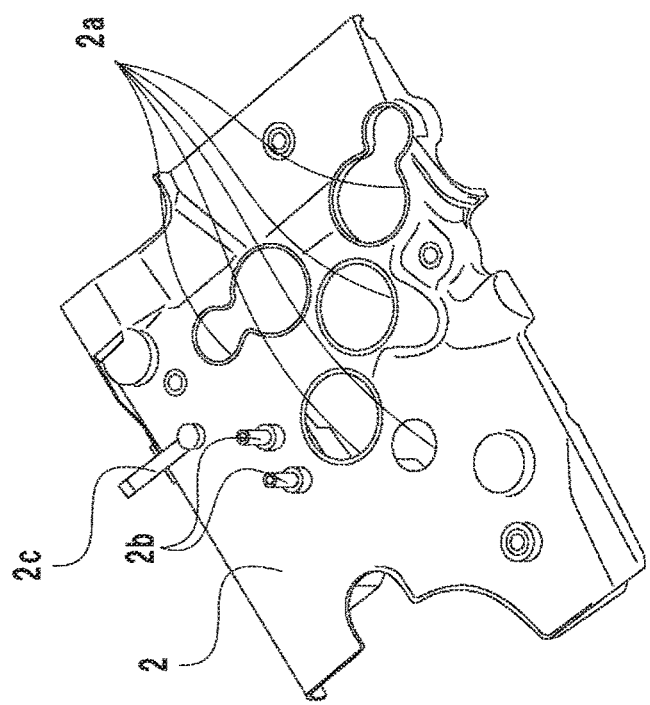
FIGS. 3A and 3B are perspective views of the breather device.
Figure 3B:
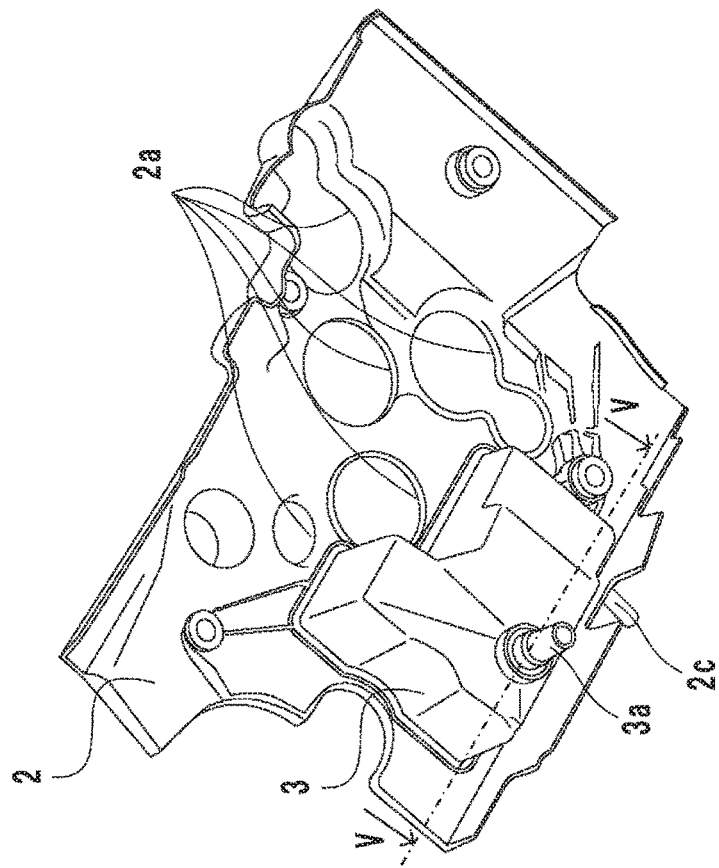

FIGS. 3A and 3B are perspective views showing a state in which the breather device 1 shown in FIG. 2 is detached from the case 10. FIG. 3A shows a state in which the ventilation portion 2c is disconnected from the breather tube BT. FIG. 3B is a perspective view of the breather device 1 in FIG. 3A viewed from below. A main body member 3 is attached to the lower surface of the cover member 2. A communicating portion 3a projects from the lower surface of the main body member 3. A communicating port 3a1 (to be described later) is formed in the communicating portion 3a.

Figure 4A:
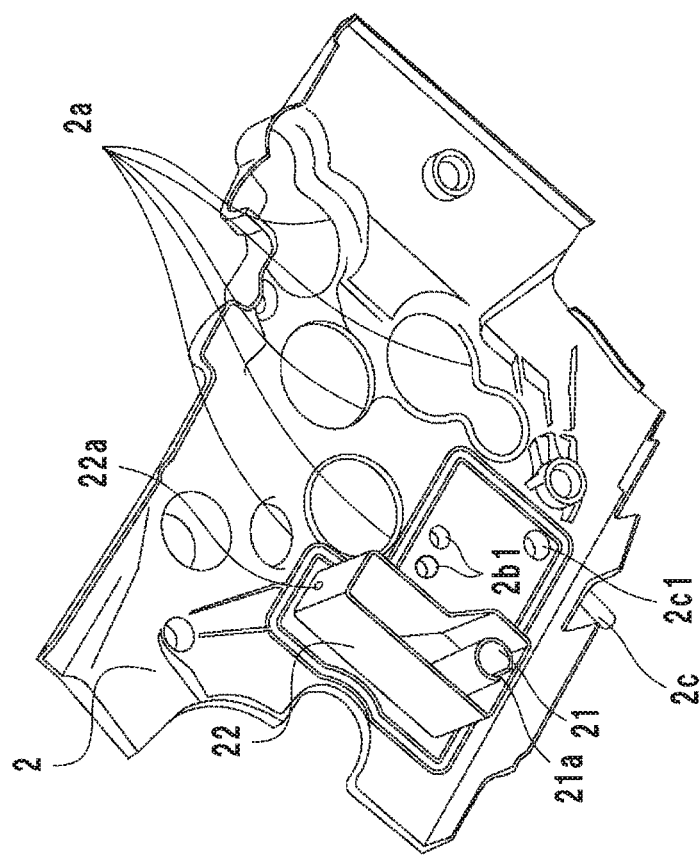
FIGS. 4A and 4B are perspective views showing a cover member and a main body member, respectively.
Figure 4B:
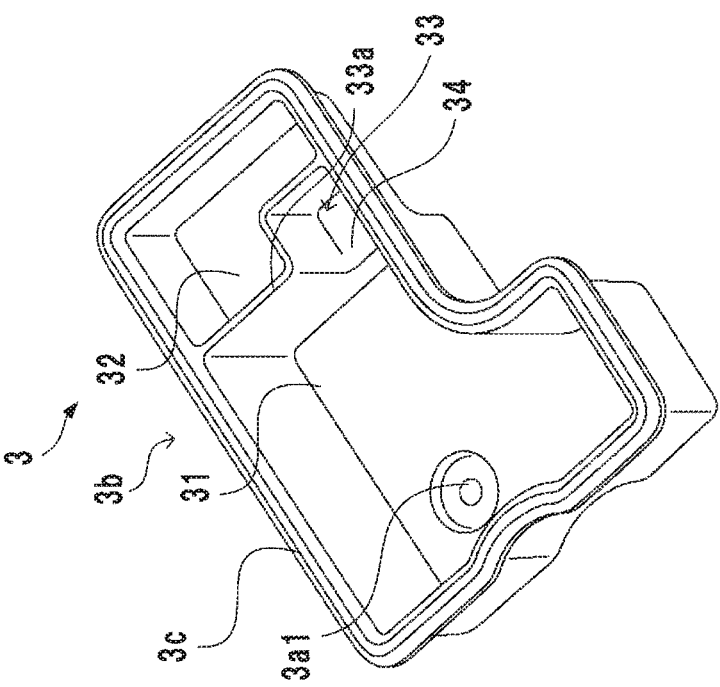

FIG. 4A is a perspective view showing the main body member 3 detached from the cover member 2, which is viewed from above to observe the inside. FIG. 4B is a perspective view of the cover member 2 in a state in which the main body member 3 is detached from the cover member 2 in the breather device 1 shown in FIG. 3B. Details of the cover member 2 and the main body member 3 will be described with reference to FIGS. 4A and 4B.

<Main Body Member 3>

As shown in FIG. 4A, the main body member 3 is formed into an L shape in a plan view, and includes a storage portion 3b with a closed bottom and an open upper end, and an upper edge portion 3c that forms the outline of the upper end of the storage portion 3b. When the main body member 3 is attached to the cover member 2, the upper edge portion 3c of the main body member 3 is, for example, welded to the bottom surface of the cover member 2, thereby fixing the main body member 3 and the cover member 2. The main body member 3 is made of, for example, a heat-resistant resin.

<First Chamber 31>

The storage portion 3b includes a first chamber 31 having, in the bottom portion, the communicating port 3a1 communicating with the interior of the case 10, and a second chamber 32 configured to receive a liquid such as water entering from the vent hole 2c1 of the cover member 2. The first chamber 31 is formed into an L shape in a plan view, and forms the largest space in the storage portion 3b. The communicating port 3a1 in the bottom portion of the first chamber 31 communicates with, for example, the clutch chamber of the transmission A. If the clutch chamber heats up, and the internal pressure rises, a gas containing oil in the clutch chamber as a mist flows for the clutch chamber into the first chamber 31 via the communicating port 3a1. If, for example, the clutch that is rotating at a high speed heats up, and the internal pressure in the clutch chamber further rises, the oil in the clutch chamber may spout from the communicating port 3a1. In this case, the first chamber 31 also serves as an oil pan to receive the spouted oil.

The communicating port 3a1 is formed in a recessed state in the bottom surface of the first chamber 31. In addition, the bottom surface of the first chamber 31 tilts toward the communicating port 3a1. For this reason, the oil gathered on the bottom surface of the first chamber 31 readily flows to the communicating port 3a1. Hence, the oil can move between the first chamber 31 and the clutch chamber or the like in the case 10.

The oil in the case 10, which has flowed into the breather device 1, can thus be returned to the case 10 again. Even if the oil spouts from the case 10 to the first chamber 31, the main body member 3 and the cover member 2 can prevent the oil from scattering out of the breather device 1.

<Second Chamber 32>

The second chamber 32 is formed next to the first chamber 31. In this embodiment, the second chamber 32 has a rectangular shape with one corner cut out in a plan view. When the main body member 3 is attached to the cover member 2, the vent hole 2c1 provided in the cover member 2 is arranged above the second chamber 32. As described above, since the ventilation portion 2c communicating with the vent hole 2c1 communicates with the outside, a liquid such as water or mud may flow into the second chamber 32 via the ventilation portion 2c depending on the traveling state of the vehicle.

<Preventing Portion 33>

The first chamber 31 and the second chamber 32 are partitioned by a third wall 33a that forms a preventing portion 33. The third wall 33a extends from the bottom portion of the storage portion 3b to the cover member 2, and forms a small gap D1 between its upper end and the cover member 2. Hence, the first chamber 31 and the second chamber 32 communicate with each other between the upper end of the third wall 33a and the inner surface of the cover member 2.

Since this prevents a liquid from circulating between the first chamber 31 that receives the oil and the second chamber 32 that receives the liquid, the liquid can be prevented from entering the case 10. The liquid circulation between the first chamber 31 and the second chamber 32 is prevented, whereas a gas circulation is enabled at the upper end of the third wall 33a. Hence, the third wall 33a can prevent generation of a pressure difference between the chambers and, for example, relieve a high pressure in the first chamber to the second chamber. Note that the main body member 3 and the third wall 33a are integrally formed. This can decrease the number of parts and easily form the preventing portion 33 including the third wall 33a in the main body member 3.

<Third Chamber 34>

The main body member 3 further includes a third chamber 34 between the first chamber 31 and the third wall 33a (preventing portion 33). In this embodiment, the third chamber 34 is formed in a space corresponding to the cutout portion of the second chamber 32, has a rectangular shape in a plan view, and includes a bottom portion higher than the bottom portion of the first chamber 31. Since the third chamber 34 and the second chamber 32 are partitioned by the third wall 33a, a liquid is prevented from circulating between the chambers. The bottom portion of the third chamber 34 forms a tilt surface that tilts downward toward the communicating port 3a1, like the bottom portion of the first chamber 31.

When the main body member 3 is attached to the cover member 2, second communicating portions 2b1 communicating with the connecting portions 2b provided in the cover member 2 are arranged above the third chamber 34. The connecting portions 2b are connected to the connecting pipe 121 extending from the hydraulic oil chamber 20. For this reason, for example, if the pressure in the hydraulic oil chamber 20 rises, the pressure in the hydraulic oil chamber 20 is relieved via the connecting portions 2b. Hence, the air exhausted from the hydraulic oil chamber 20 of the transmission A can be exhausted to the outside via the breather device 1. Even if the oil in the hydraulic oil chamber 20 spouts, it can safely be returned to the case.

<Cover Member 2>

The cover member 2 is, for example, welded to the upper edge portion 3c of the main body member 3 and closes the main body member 3. As shown in FIG. 4B, the cover member 2 includes, at portions corresponding to the main body member 3, the vent hole 2c1 for ventilation to the outside, the second communicating portions 2b1 communicating with the connecting portions 2b, a first wall 21 that extends to the communicating port 3a1 and prevents the oil spouted from the communicating port 3a1 from scattering, and a second wall 22 that extends toward the first chamber 31 so as to cover the first wall 21.

The first wall 21 has a tubular shape having a larger diameter than the communicating port 3a1. With this structure, even if the oil spouts from the case 10 to the first chamber 31, the oil can be prevented from scattering to the second chamber 32 or throughout the first chamber 31.

The first wall 21 includes, on the side of the cover member 2, a first ventilation portion 21a for ventilation to the first chamber 31. In this embodiment, the first ventilation portion 21a is a slit extending in the longitudinal direction of the first wall 21. When the slit is provided, for example, even if the oil is gathered near the communicating port 3a1, and the lower opening of the first wall 21 is closed by the oil, a gas can circulate between the first chamber 31 and the inside of the first wall 21, and generation of a pressure difference between the first chamber 31 and the inside of the first wall 21 can be prevented. Note that the first ventilation portion 21a is not limited to the slit, and may be an opening such as a hole formed on the cover member side.

The second wall 22 is an annular closed wall formed almost throughout the first chamber 31. With this structure, the gas containing the mist-shaped oil that has flowed into the first chamber 31 can contact the second wall 22, and the second wall 22 can adsorb the oil. Then, the oil running down from the second wall 22 is collected in the first chamber and recovered in the case 10 via the communicating port 3a1. Hence, the oil can efficiently be recovered from the gas.

The second wall 22 includes, on the side of the cover member 2, a second ventilation portion 22a for ventilation to the first chamber 31. In this embodiment, for example, a small-diameter hole is employed as the second ventilation portion 22a. However, a slit like the first ventilation portion 21a may be employed. When the second ventilation portion 22a is formed in the second wall 22, for example, even if the lower opening of the second wall 22 is closed by the oil, a gas can circulate between the first chamber 31 and the inside of the second wall 22, and generation of a pressure difference between the first chamber 31 and the inside of the second wall 22 can be prevented.

Note that the cover member 2, the first wall 21, and the second wall 22 are integrally formed. This can decrease the number of parts and easily form a plurality of partitions in the first chamber 31 of the storage portion 3b. The cover member 2 is made of, for example, a heat-resistant resin. The cover member 2 includes the vent hole 2c1 communicating with the ventilation portion 2c at a portion corresponding to the second chamber 32 when the main body member 3 is attached, and the second communicating portions 2b1 communicating with the hydraulic oil chamber 20 of the transmission A at portions corresponding to the third chamber 34.

Figure 5:
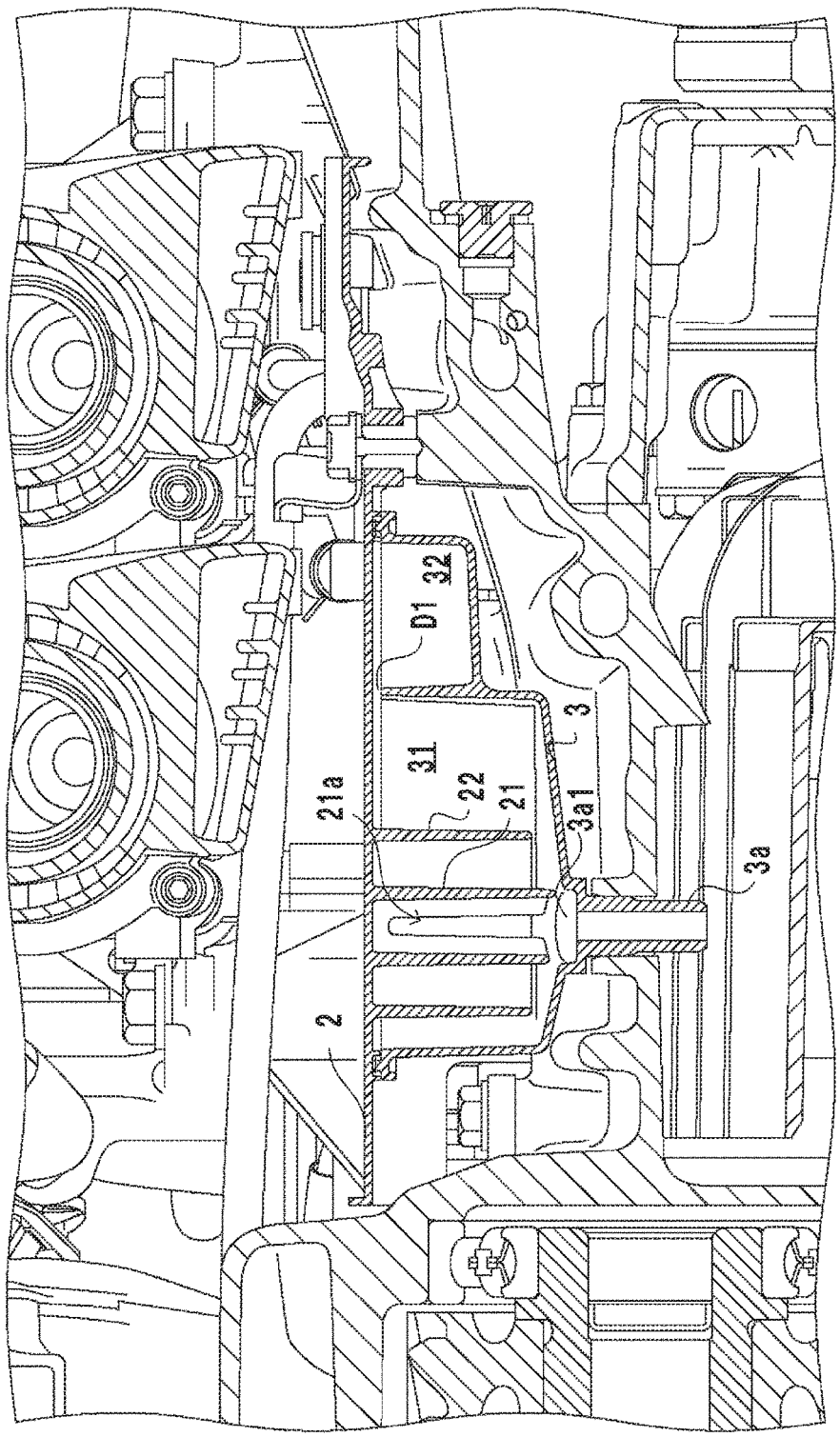
FIG. 5 is a view of the upper surface of a case after the breather device is detached.

FIG. 5 is a sectional view taken along a line V-V in FIG. 3B. As shown in FIG. 5, a gap is formed between the bottom surface of the first chamber 31 and the lower ends of the first wall 21 and the second wall 22. In addition, the lower end of the first wall 21 is formed toward the bottom surface of the first chamber 31 (the recess around the communicating port 3a1) to be longer than the lower end of the second wall 22. The gap D1 that allows the gas to move is formed between the cover member 2 and the third wall 33a of the preventing portion 33.

Figure 6:
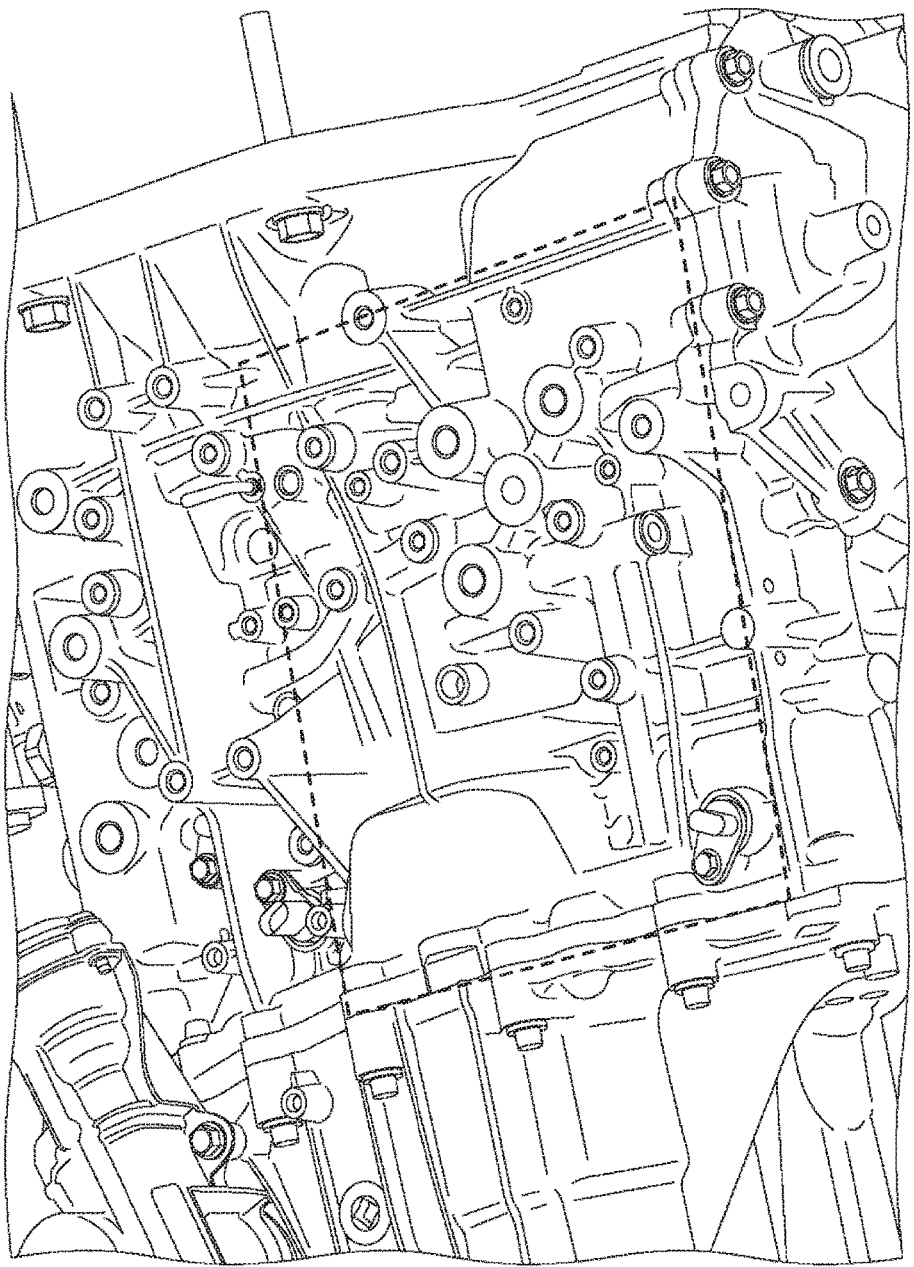
FIG. 6 is a sectional view of the breather device arranged on the upper surface of the case.

FIG. 6 shows the upper surface of the case 10 in a state in which the breather device 1 is detached. A region indicated by a chain line in FIG. 6 corresponds to the region indicated by the chain line in FIG. 1. That is, the main body member 3 of the breather device 1 is stored in the recess in the upper surface of the case 10 in the region indicated by the chain line. Additionally, since the cover member 2 is fixed on the main body member 3, the cover member 2 covers part of the case 10 including the recess. With this structure, for example, even if the oil in the case 10 spouts, the oil can be returned to the case 10 without scattering it.

As shown in FIG. 6, a plurality of recesses exist in the upper surface of the case 10. In a case in which horizontal hole formation can be done for ribs that form the recesses, even if the oil is gathered in the recesses due to the horizontal holes, the oil can be discharged. However, in a case in which such horizontal holes cannot be formed in the ribs from the viewpoint of the location of the ribs, the recesses are closed by the cover member 2, as in this embodiment. This can prevent the oil from gathering in the upper portion of the case 10 even if the oil is spilled to the upper portion of the case. In addition, when the breather device 1 is directly arranged on the case 10, the recessed space of the case 10 can effectively be used as the breather chamber, and the oil or water can be prevented from gathering in the upper portion of the case 10.

<Operation of Breather Device>

Figure 7:
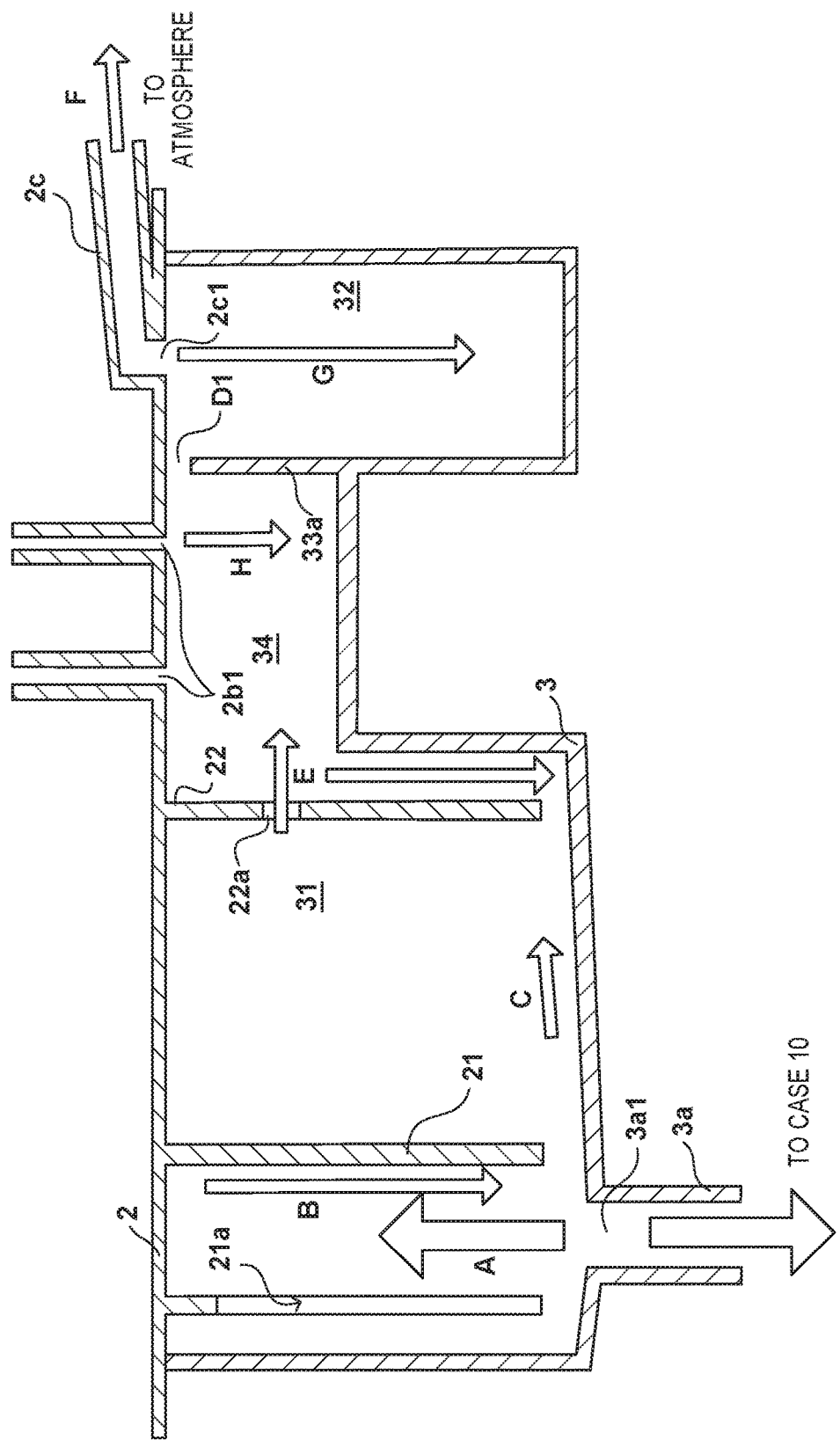
FIG. 7 is a schematic explanatory view showing the operation of the breather device.

FIG. 7 is a schematic explanatory view showing the operation of the breather device. In FIG. 7, the first chamber 31, the second chamber 32, and the third chamber 34 are not illustrated in the layout shown in other drawings. To explain the circulations of the liquid and gas between the chambers, the chambers are illustrated continuously for the descriptive convenience. The first chamber 31 is shown on the left side of FIG. 7, the third chamber 34 is shown at the center, and the second chamber 32 is shown on the right side.

If the internal pressure in the case 10 rises, liquid oil or a gas containing mist-shaped oil flows into the first chamber 31 in a direction indicated by an arrow A in FIG. 7. First, the liquid oil that has flowed into the first chamber 31 is dropped by the first wall 21 in the direction of an arrow B and deposited on the bottom portion of the first chamber 31. On the other hand, the gas containing the mist-shaped oil, for example, passes through the first ventilation portion 21a or the gap between the first wall 21 and the bottom portion of the first chamber 31, thereby moving in the direction of an arrow C. At this time, the gas located on the upper side of the first chamber 31 is going to move to the outside of the second wall 22 via the second ventilation portion 22a.

From the gas containing the mist-shaped oil that has collided against the inside of the second wall 22 or the side wall of the first chamber 31 between the first chamber 31 and the third chamber 34, the oil is adsorbed by the walls. The oil, for example, drops by its own weight in a direction indicated by an arrow E and is deposited on the bottom portion of the first chamber 31. The gas separated from the oil is exhausted to the atmosphere side via the third chamber 34, the upper end of the third wall 33a, and the vent hole 2c1 communicating with the ventilation portion 2c, as indicated by an arrow F.

A liquid such as water or mud that has flowed from outside into the second chamber 32 via the ventilation portion 2c drops by its own weight as indicated by an arrow G in FIG. 7 and is deposited on the bottom portion of the second chamber 32. Note that an exhaust port for appropriately exhausting the gathered liquid may be formed in the bottom portion of the second chamber 32.

The second communicating portions 2b1 communicating with the connecting portions 2b of the hydraulic oil chamber 20 are arranged on the upper side of the third chamber 34.

Hence, if the pressure in the third chamber 34 becomes lower than that in the hydraulic oil chamber 20, the oil is supplied from the hydraulic oil chamber 20. The thus supplied oil can drop in the direction indicated by the arrow E in FIG. 7 and flow into the case 10 via the communicating port 3a1. In addition, for example, if tubes are arranged from the second communicating portions 2b1 to the bottom portion of the third chamber 34, the oil gathered in the third chamber 34 can be returned to the hydraulic oil chamber 20 in a case in which the pressure in the hydraulic oil chamber 20 becomes lower than that in the third chamber 34.

<Summary of Embodiment>

1. According to a breather device (for example, 1) of the embodiment, a breather device that is attached to a case (for example, 10) of a transmission and performs ventilation in the case comprises a main body member (for example, 3) including a storage portion (for example, 3b) with a closed bottom and an open upper end, and a cover member (for example, 2) configured to close the upper end of the main body member and including a vent hole (for example, 2c1) for ventilation to outside, wherein the storage portion comprises a first chamber (for example, 31) having, in a bottom portion, a communicating port (for example, 3a1) communicating with an interior of the case, and a second chamber (for example, 32) configured to receive a liquid entering from the vent hole, the communicating port allows oil to move between the case and the first chamber, and the main body member comprises a preventing portion (for example, 33) configured to prevent the liquid from circulating between the first chamber and the second chamber.

According to this arrangement, the oil in the case, which has flowed into the breather device, can be returned to the case again. In addition, since the liquid is prevented from circulating between the first chamber that receives the oil and the second chamber that receives the liquid, the liquid can be prevented from entering the case. Furthermore, even if the oil spouts from the case to the first chamber, the main body member and the cover member can prevent the oil from scattering out of the breather device.

2. According to the breather device of the embodiment, a gap (for example, D1) that allows a gas to move may be formed between the preventing portion and the cover member.

According to this arrangement, a liquid circulation between the first chamber and the second chamber is prevented, whereas a gas circulation is enabled. This can prevent generation of a pressure difference between the chambers and, for example, relieve a high pressure in the first chamber to the second chamber.

3. According to the breather device of the embodiment, the cover member may comprise a first wall (for example, 21) that extends to the communicating port and prevents scattering of the oil spouting from the communicating port.

According to this arrangement, even if the oil spouts from the case to the first chamber, the oil can be prevented from scattering to the second chamber or throughout the first chamber.

4. According to the breather device of the embodiment, the first wall may have a tubular shape with a larger diameter than the communicating port, and may comprise, on the side of the cover member, a first ventilation portion (for example, 21a) for ventilation to the first chamber.

According to this arrangement, even if the oil is gathered near the communicating port, and the lower opening of the first wall is closed by the oil, a gas can circulate between the first chamber and the inside of the first wall, and generation of a pressure difference between the first chamber and the inside of the first wall can be prevented.

5. According to the breather device of the embodiment, the cover member may comprise a second wall (for example, 22) that extends toward the first chamber so as to cover the first wall, and the second wall may comprise, on the side of the cover member, a second ventilation portion (for example, 22a) for ventilation to the first chamber.

According to this arrangement, the gas containing the mist-shaped oil that has flowed into the first chamber contacts the second wall, and the second wall adsorbs the oil, thereby efficiently recovering the oil from the gas. In addition, even if the lower opening of the second wall is closed by the oil, a gas can circulate between the first chamber and the inside of the second wall, and generation of a pressure difference between the first chamber and the inside of the second wall can be prevented.

6. According to the breather device of the embodiment, the cover member, the first wall, and the second wall may be integrally formed.

According to this arrangement, it is possible to decrease the number of parts and easily form a plurality of partitions in the storage portion.

7. According to the breather device of the embodiment, the breather device may further comprise a third chamber (for example, 34) arranged between the first chamber and the preventing portion, the third chamber may comprise a bottom portion higher than the bottom portion of the first chamber, and the cover member may comprise, at a portion corresponding to the third chamber, a second communicating portion (for example, 2b1) communicating with a hydraulic oil chamber of the transmission.

According to this arrangement, it is possible to guide the oil supplied from the hydraulic oil chamber of the transmission into the case and make refilling even in case of a shortage of the oil in the case.

8. According to the breather device of the embodiment, each of the bottom portions of the first chamber and the third chamber may comprise a tilt surface that tilts downward toward the communicating port.

According to this arrangement, since the oil gathered in the first chamber and the third chamber is guided to the communicating port, the oil can be returned to the case without any waste.

9. According to the breather device of the embodiment, the communicating port may communicate with a clutch chamber of the transmission, the main body member may be stored in a recess of an upper surface of the case, and the cover member may cover the recess.

According to this arrangement, even if the oil scatters at the time of exchange of the oil in the case, the oil can be prevented from gathering in the upper portion of the case. In addition, when the breather device is directly arranged on the case, the recessed space of the case can effectively be used as the breather chamber, and the oil or water can be prevented from gathering in the upper portion of the case.

10. According to the breather device of the embodiment, the preventing portion may comprise a third wall (for example, 33a) that extends from the main body member to the cover member.

According to this arrangement, the member for preventing a liquid circulation from the second chamber to the first chamber is formed in a wall shape, thereby partitioning the second chamber by the simple structure.

11. According to the breather device of the embodiment, the main body member and the third wall may be integrally formed.

According to this arrangement, it is possible to decrease the number of parts and easily form the preventing portion in the main body member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-034707, filed Feb. 25, 2016, which is hereby incorporated by reference herein in its entirety.

What is claimed is:

1. A breather device that is attached to a case of a transmission and performs ventilation in the case, comprising:
   a main body member including a storage portion with a closed bottom and an open upper end; and
   a cover member configured to close the upper end of the main body member and including a vent hole for ventilation to outside,
   wherein the storage portion comprises a first chamber having, in a bottom portion, a communicating port communicating with an interior of the case, and a second chamber configured to receive a liquid entering from the vent hole,
   the communicating port allows oil to move between the case and the first chamber,
   the main body member comprises a preventing portion configured to prevent the liquid from circulating between the first chamber and the second chamber,
   the storage portion further comprises a third chamber arranged between the first chamber and the preventing portion,
   the third chamber comprises a bottom portion higher than the bottom portion of the first chamber, and
   the cover member comprises, at a portion corresponding to the third chamber, a second communicating portion communicating with a hydraulic oil chamber of the transmission.

2. The device according to claim 1, wherein a gap that allows a gas to move is formed between the preventing portion and the cover member.

3. The device according to claim 1, wherein the cover member comprises a first wall that extends to the communicating port and prevents scattering of the oil spouting from the communicating port.

4. The device according to claim 3, wherein the first wall has a tubular shape with a larger diameter than the communicating port, and comprises, on a side of the cover member, a first ventilation portion for ventilation to the first chamber.

5. The device according to claim 4, wherein the cover member comprises a second wall that extends toward the first chamber so as to cover the first wall, and
   the second wall comprises, on the side of the cover member, a second ventilation portion for ventilation to the first chamber.

6. The device according to claim 5, wherein the cover member, the first wall, and the second wall are integrally formed.

7. The device according to claim 5, wherein the preventing portion comprises a third wall that extends from the main body member to the cover member.

8. The device according to claim 7, wherein the main body member and the third wall are integrally formed.

9. The device according to claim 1, wherein each of the bottom portions of the first chamber and the third chamber comprises a tilt surface that tilts downward toward the communicating port.

10. The device according to claim 1, wherein the communicating port, which is formed in a recessed state in the bottom portion of the first chamber, communicates with a clutch chamber of the transmission,
    the main body member is stored in a recess of an upper surface of the case, and
    the cover member covers the recess.

* * * * *